Oct. 28, 1952 M. L. DOELZ 2,615,981

ELECTROMECHANICAL FILTER

Filed Jan. 14, 1949

INVENTOR
MELVIN L. DOELZ
BY John J. Rogan
ATTORNEY

Patented Oct. 28, 1952

2,615,981

UNITED STATES PATENT OFFICE 2,615,981

ELECTROMECHANICAL FILTER

Melvin L. Doelz, Cedar Rapids, Iowa, assignor to Collins Radio Company, Cedar Rapids, Iowa, a corporation of Iowa Application January 14, 1949, Serial No. 70,829

21 Claims. (Cl. 178—44)

This invention relates to wave energy transmission systems, and more particularly it relates to electromechanical filters for the transmission of electrical waves.

A principal object is to provide an improved band-pass filter of the electromechanical type, employing electromechanical input and output transducer elements which are intercoupled by a series of novel mechanical vibratory elements.

Another principal object is to provide a plural section electromechanical filter having a restricted band width, while nevertheless possessing a high degree of mechanical or structural stability as a whole.

A further object is to provide an improved electromechanical filter which is efficient for the band-pass filtering of frequencies of the order of one-half megacycle or lower and having a high degree of mechanical or structural stability.

A feature of the invention relates to an electromechanical filter having a series of spaced resonant discs which are mechanically coupled by pins arranged in staggered or offset relation with respect to the common axial center of the discs.

Another feature relates to an electromechanical filter employing a series of resonant discs which are assembled with their planes parallel to each other, and with interconnecting pins attached to the respective discs in offset relation with respect to the center of the discs.

A further feature relates to an improved electromechanical filter employing a series of resonant discs coupled by respective pins, the input and output discs of the series being provided with respective magnetostrictive transducer wires, the said wires being coupled to the associated discs and the respective pins being coupled to the associated discs in offset relation to the disc centers.

A further feature relates to an electromechanical filter employing a series of spaced resonant discs mounted in substantial spaced parallelism and provided with respective interconnecting coupling pins which are attached to the respective discs and in predetermined relation to the nodal region so as to control the frequency band width of the filter.

A still further feature relates to the novel organization, arrangement and relative interconnection and proportioning of parts which cooperate to provide an electromechanical filter which is reproducible in mass production with a high degree of uniformity; and wherein all the filter elements are simple in shape, can readily be machined and ground to very close tolerances, while also eliminating the necessity of individual trimming of the various elements.

Other features and advantages not particularly enumerated, will be apparent after a consideration of the following detailed description and the appended claims.

In the drawing which shows, by way of example, one preferred embodiment,

Figures 1, 7:
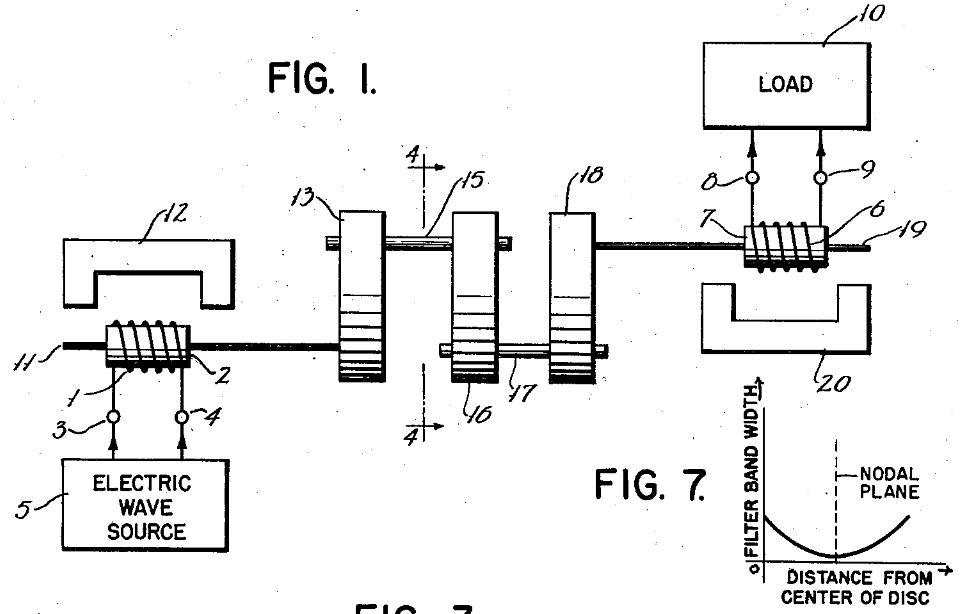
Fig. 1 is a plan view of a filter system according to the invention.
Fig. 7 is a graph explanatory of one feature of the invention.

It has been proposed heretofore to provide an electromechanical filter employing a series of rigid masses coupled together by springs. One of the disadvantages of such an arrangement is the difficulty of designing the filter elements when the filter is to have a pass-band with a mid-frequency of a relatively high order, for example in the order of megacycles per second. It has been suggested to design the masses as mechanically resonant rectangular metal plates arranged in substantially coplanar array with their adjacent parallel edges coupled to each other by wires which act as springs. With such an arrangement, the pass-band of the filter is determined by the mechanical impedance of the coupling wires between the plates and the impedance of the driving or transducer elements at the input and output ends of the filter, with respect to the impedance of the said plates. Thus, for a given filter, a reduction of one-half in the per cent band width requires a reduction of one-half in the cross-sectional area of the plate coupling pins. Furthermore, if, as in accordance with this invention, the transducer elements are in the form of magnetostrictive wires, a reduction in the band width of the filter requires an even much greater reduction in the cross-sectional area of the said wires. If very thin wires are used for coupling and driving the discs, the structural stability of the filter as a whole is seriously reduced and at the same time the difficulty and expense of manufacturing the parts to the required tolerances are correspondingly increased.

I have found that by using a series of discs, preferably, although not necessarily, circular, and preferably, although not necessarily, of a metal such as steel, mounted in spaced parallelism, and by attaching the transducer wires and the inter-disc coupling elements at predetermined distances from the disc centers, it is possible to design a filter for high frequency use and with the desired narrow pass band while using filter elements of a practical size. In fact, with this arrangement, the driving or transducer elements respectively at the input and output ends of the filter can be constituted of rods or wires, and the inter-disc coupling elements can consist of rods or pins having a relatively large cross-section. One of the important features of this invention is that by predetermined location of the points of attachment of the rods or wires in an offset relation with respect to the centers of their associated discs, the frequency pass band of the filter can be given any desired width. The relation between the point of attachment of the rods or wires with respect to the disc centers and the resultant band width is diagrammatically illustrated in the graph of Fig. 7. From this graph, it will be seen that the band width of the filter is greatest when the point of attachment is close to the center of the disc and it is also greatest when it is attached adjacent the border of the disc. On the other hand, when the point of attachment is adjacent the circular nodal region or line of the disc, the band width is at a minimum. Advantage is taken of this feature of the invention to control the band width of any desired filter using the structural elements and their relation as disclosed herein.

Figure 2:
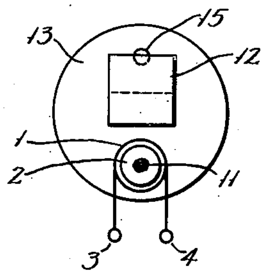
Fig. 2 is a left-hand end view of Fig. 1.
Figure 3:
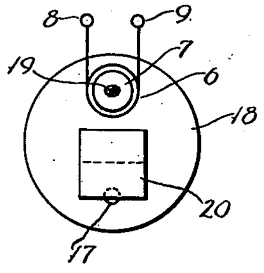
Fig. 3 is a right-hand end view of Fig. 1.
Figure 4:
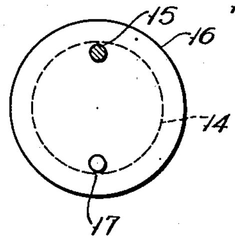
Fig. 4 is a sectional view of Fig. 1, taken along the line 4—4 thereof, and viewed in the direction of the arrows.
Figure 5:
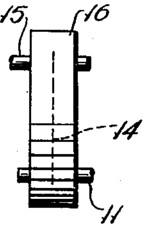
Fig. 5 is an edge view of Fig. 4.

Referring to Fig. 1, the filter according to the invention, comprises an input coil or winding 1, wound around a suitable and stationarily mounted tubular insulation form 2, the winding terminals 3, 4, being connected to any source 5, of electrical wave energy, such as that used for intermediate frequency amplifiers in superheterodyne systems, frequency converters and the like. The filter also has an output coil or winding 6 wound on a suitable stationarily mounted tubular insulation form 7, with its winding terminals 8, 9, connected to any suitable load device or circuit 10, to which the electric waves are to be transmitted. The coil 1 surrounds a nickel wire or rod 11 which, as is well-known, possesses magnetostrictive properties and is arranged to pass freely through the form 2 and with the outer end free. Thus, when the coil 1 is energized by the impressed electric wave energy, it causes the length of wire 11 to change correspondingly by magnetostrictive action and the wire 11 vibrates. The vibratory force of the wire 11 is transmitted to the discs by reaction with the distributed mass of the driving wire. Mounted adjacent the wire 1 is a permanent magnet 12, which produces a magnetc field through the length of wire 11 to provide it with a predetermined fixed axial magnetic bias. The left-hand end of wire 11 is free, and the right-hand end is staked or otherwise fastened into a circular steel disc 13. In accordance with one feature of the invention, and as illustrated in Fig. 2, the wire or rod 11 is attached to disc 13 at a point offset from the disc center, and preferably, although not necessarily, slightly offset from the nodal ring represented by the dotted line 14. Preferably the wire 11 is cut to a length so as to be mechanically resonant at an odd quarter-wavelength, for example three-quarters of the wavelength of the mid-frequency of the pass band for which the filter is designed, so as to present a mechanical impedance at its junction with disc 13 analogous to that of a parallel resonant electric circuit. A length of ¾ wavelength is selected for convenience in construction and to give a long enough element for good coupling from the coil. A long thin mechanical element subject to axial disturbances is analogous to an electrical transmission line with force equivalent to voltage and velocity equivalent to current. A free end will vibrate with very high velocities under the influence of a small force and so is equivalent to a short circuit, similarly a clamped end is equivalent to an open circuit. The equivalent circuit for the filter shows a parallel resonant circuit for the driving wire. Since an electrical transmission line ¼, ¾, 5/4, wavelength long shows properties similar to those of a parallel resonant circuit in the vicinity of resonance it follows the analogous wire will serve the required function in the mechanical system. Also in accordance with the invention, disc 13 is cut to resonate at the same pass band mid-frequency and preferably in a mode involving the single concentric circular line 14. The disc 13 has a thickness *"t"* which is small compared with the disc diameter, and therefore it may be considered analogous to a series resonant electric circuit connected to the parallel resonant drive constituted of wire 11.

Tightly fitted into disc 13 so as to be effectively integral therewith, and at a point offset from the disc center, preferably adjacent to the circular nodal line 14, and also diametrically opposite to the point of atachment of wire 11, is a steel coupling pin 15. The right-hand end of pin 15 is tightly fitted into another disc 16 which has the same dimensions and is constituted preferably of the same material as disc 13. The pin 15 is fastened into disc 16 likewise adjacent the circular nodal line of this disc. Also fastened into disc 16 is another and similar coupling pin 17 which is fastened into the said disc 16 adjacent its circular nodal line and diametrically opposite to the point of attachment of pin 15. Similarly, the right-hand end of coupling pin 17 is tightly fitted into another circular disc 18 of the same dimensions and material as discs 13 and 16. Here again the pin 17 is attached to disc 18 adjacent to the circular nodal line of that disc. Also attached to disc 18 adjacent the circular nodal line and diametrically opposite to pin 17 is a nickel wire or rod 19 which passes freely through the coil form 7. Also associated with this wire 19 is a permanent magnet 20 for applying to the wire 19 a predetermined fixed and axially extending magnetic bias.

The wire 19 like the wire 11 is cut to a length so as to be mechanically resonant at an odd quarter wave-length, for example three-quarters of the wavelength of the mid-frequency of the pass band for which the filter is designed. The pins 15 and 17 are cut to a length so that the spacing between adjacent discs is approximately one-eighth the wavelength of the said mid-frequency, and each pin therefore is essentially a compliance between the adjacent coupled discs and can be represented analogously by a shunt capacitor. Since these coupling pins are not resonant at the operating frequency of the filter, their length, between adjacent discs, can be less than one-quarter wavelength, providing the pin diameter and pin material are correspondingly chosen to present the correct compliance between the adjacent coupled discs.

While in the foregoing, the discs and coupling rods are preferably made of steel, it will be understood that they can be made of any other material which has a high mechanical "Q," that is, any material which will vibrate freely for a relatively long period after the excitation force is removed. Furthermore, the discs need not necessarily be circular. They can be rectangular or of practically any shape so long as the required resonance is obtained and so long as the discs are mounted with their planes substantially transverse to the length of the coupling rods. However, there is a real practical advantage in using simple symmetrical shapes for the discs, such as circular shapes, since the high degree of accuracy required in machining the discs is more easily obtainable and also because they symmetrically resonate with fewer spurious resonance frequencies. Furthermore, while the drawing shows the coupling rods attached to their respective discs radially within the region enclosed by the nodal ring on the side nearer to the center of the disc, it will be understood that they can be attached adjacent to the nodal ring at any desired point between the nodal ring and the boundary of the disc in accordance with the frequency band width which is desired for the filter.

The entire filter assembly can be supported between rubber or felt pads in contact with the disc circumference, or in contact with the coupling pins. Because of the stiffness of the filter elements, these pads have little effect on the filter action and the result is the same as though the filter were completely unsupported.

Figure 6:
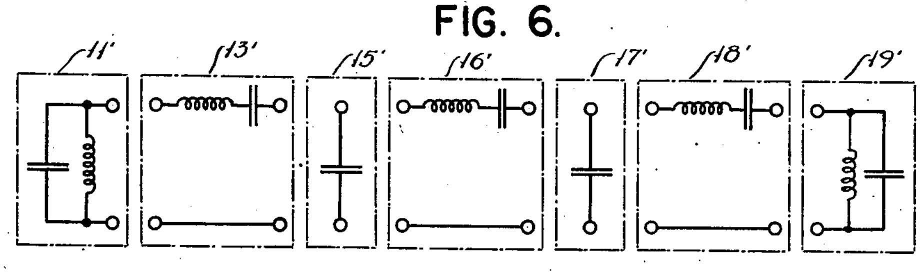
Fig. 6 is a schematic circuit diagram analogous to the system of Fig. 1.

Fig. 6 shows the equivalent electric schematic circuit corresponding to the system of Fig. 1. The electric circuit elements of Fig. 6 which are analogous to the corresponding structural elements of Fig. 1, are designated by the same numerals primed.

The width of the pass band of the filter is determined by the ratios of the mechanical impedance of the coupling pins 15, 17, and the driving wires 11, 19, with respect to the disc impedance and the points of attachment of the pins to their discs. If the wires 11 and 19, and the pins 15, 17, were fastened to the discs at the center thereof, the said wires and pins would have to be of very much smaller cross-sectional size, and if the filter is designed for very high frequency use, this materially reduces the structural stability of the filter unit. It can be shown that the resonant impedance of each of the discs 13, 16, 18, rises to a maximum at the nodal circle 14, and diminishes to a minimum at the center and outer edge of the disc. Therefore, by offsetting the points of connection of the transducer wires and the coupling pins with respect to the disc centers, it is possible to increase the effective disc impedance and thereby obtain the very narrow bands required for intermediate frequency amplifiers and similar devices.

Furthermore, as a result of the structure shown, it is possible to manufacture the discs 13, 16 and 17 to the requisite dimensional tolerances by inexpensive mass production methods, and also the wires 11, 19, and the coupling pins 15, 17, can likewise be manufactured with the desired accuracy by ordinary manufacturing processes. One of the advantages of the electromechanical filter such as disclosed, lies in the superior band-pass characteristics available because of the low losses in the steel resonator discs; and the possibility of constructing a filter involving a large number of resonant elements without the use of intermediate stages of amplification, and in the compact and structural stability of the filter.

While the drawing shows a filter employing three resonator discs, it will be understood that a greater or less number may be employed without departing from the object of the invention. Furthermore, while specific materials have been mentioned for the various parts, it will be understood that various changes and modifications may be made therein without departing from the spirit and scope of the invention.

As a typical example of a filter that has been found to produce the desired results and designed for operation at a mid-frequency of .2049 megacycle per second, and with a pass band of .00758 megacycle per second, the wires 11 and 19 were constituted of nickel each having a length of .672 inch and a diameter of .010 inch, the circular discs 13, 16 and 18 were of steel having a thickness of .092 inch and a diameter of .692 inch. The pins 15 and 17 were attached to the respective discs at a point offset radially inward .060 inch from the circular nodal ring 14 which had a diameter of .260 inch. It will be understood that the above-mentioned diameters and parameters are given merely by way of example and not by way of limitation.

What is claimed is:

1. A filter for electric waves, comprising, a series of substantially planar members mounted with their planes in substantial spaced parallelism, longitudinally rigid means coupling immediately adjacent planar members at points offset from their centers, input transducer means connected to the first member of the series, and output transducer means connected to another member of the series, each successive pair of said rigid coupling members between successive discs being also offset with relation to each other.

2. A filter according to claim 1, in which said coupling means are in the form of rigid pins cut to a length approximately equal to one-eighth of the wavelength of the mid-frequency of the pass-band for which the filter is designed, and with successive pins offset with respect to each other 3. A filter according to claim 1, in which each of said transducer means comprises a magnetostrictive member having a length equal to an odd quarter wavelength of the mid-operating frequency of the filter.

4. A filter according to claim 1, in which each of said transducer means comprises a magnetostrictive member and a field coil electromagnetically coupled thereto.

5. A filter according to claim 1, in which each of said coupling means comprises a longitudinally rigid metal pin having a predetermined compliance.

6. A filter according to claim 1, in which said planar members are of material having a high mechanical "Q" and said coupling means are in the form of rigid pins also having a high mechanical "Q."

7. A filter according to claim 1, in which said coupling means are in the form of rigid pins each attached to an adjacent pair of said members and at a point adjacent a circular nodal region thereof.

8. A filter for electric waves, comprising, a series of discs mounted with their planes in spaced parallelism, longitudinally rigid means coupling immediately adjacent discs at point offset from their centers, each successive pair of said rigid coupling means between successive discs being also offset with respect to each other, input transducer means connected to the first disc of the series at a point offset from the center thereof, and output transducer means connected to another disc of the series at a point offset from the center thereof, and offset from the point of coupling of said input transducer means.

9. A filter according to claim 8, in which said discs are of steel, said coupling means being in the form of steel pins, and each of said transducer means includes a magnetostrictive wire and a field coil surrounding each wire for subjecting the filter to vibration in the longitudinal direction of said rigid coupling means.

10. A filter according to claim 8, in which said coupling means are in the form of rigid pins each pin extending between adjacent discs and attached adjacent a circular nodal region thereof, the coupling pin between one pair of discs being substantially diametrically opposite to the coupling pin on the next adjacent pair of discs.

11. A filter according to claim 8, in which each of said discs is circular and has its thickness and diameter correlated to render the disc resonant at the mid-frequency of the pass-band for which the filter is designed.

12. A filter for electric waves, comprising, a series of discs mounted with their planes in substantial spaced parallelism, means coupling immediately adjacent discs at points offset from their centers in accordance with the frequency band width required for the filter, input transducer means connected to the first disc of the series at a point offset from the center thereof, and output transducer means connected to another disc of the series at a point offset from the center thereof, each of said transducer means comprising a straight nickel wire surrounded by an electromagnetic coil each of said wires being cut to length approximately equal to an odd quarter-wavelength corresponding to the mid-frequency of the pass-band for which the filter is designed.

13. A filter according to claim 12, in which each of said wires has mounted adjacent thereto a permanent magnet for applying a predetermined fixed magnetostrictive bias thereto.

14. A filter system, comprising, an input coil, an output coil, a magnetostrictive wire passing through said input coil, a magnetostrictive wire passing through said output coil, each of said wires having its outer end free, the inner ends of said wires being connected together by a series of spaced parallel discs each having its dimensions correlated so as to be resonant at the mid-frequency of the pass-band for which the filter is designed, a single rigid pin connecting each adjacent pair of discs, each pin being fastened to the said pair of discs at a point adjacent a circular nodal region of the discs and with the pins for successive pairs being in offset relation.

15. A filter system according to claim 14, in which each of said discs is circular and has a thickness which is small compared with the disc diameter.

16. A filter system, comprising, a plurality of circular discs each having a high mechanical "Q" said discs being arranged with their planes in spaced planar parallelism with a common central axis, a rigid pin connecting immediately adjacent discs and being attached to each disc at a point between the center and margin of the disc which point is predetermined in accordance with the desired frequency band width of the filter, transducer means to vibrate one disc in accordance with input electric signals, each successive pair of rigid pins between successive discs being also offset with relation to each other and means to couple the other disc to an output circuit said pin extending substantially perpendicular to the planes of said discs.

17. A wave filter comprising a series of spaced discs each having a thickness which is small in comparison with the width and length of the face thereof, the discs being arranged with their faces substantially parallel, and a longitudinally rigid pin extending between the parallel faces of immediately adjacent discs and connected at opposite ends to each disc at a point offset from the central region of the face thereof, successive pairs of rigid pins between successive discs being also offset with relation to each other.

18. A wave filter according to claim 17 in which said discs are spaced apart a distance substantially less than one-quarter wavelength at the mid-operating frequency of the filter and are dimensioned to resonate at said mid-frequency.

19. A wave filter having an input end and an output end, and comprising a series of spaced discs arranged in stacked parallel planar array, pin means interconnecting said discs between their immediately adjacent planar faces to form a unit which is longitudinally rigid in the direction of wave propagation between said input and said output ends, each pin means being fastened at opposite ends to the adjacent planar faces of adjacent discs at a point offset from the central region thereof, successive pins between successive discs being also offset with relation to each other and means at said input end to apply a mechanical vibratory force to vibrate said discs in the same direction as the direction of wave propagation through the filter.

20. A wave filter according to claim 19 in which the discs are circular and the pin means are fastened to the discs at a point located substantially on a circular vibrational node thereof.

21. A filter according to claim 19 in which said discs are free from rigid attachments except at the point of attachment of said pins.

MELVIN L. DOELZ.

REFERENCES CITED

The following references are of record in the file of this patent:

UNITED STATES PATENTS

| Number | Name | Date |
|---|---|---|
| 1,654,123 | Hartley | Dec. 27, 1927 |
| 1,666,681 | Burgess | Apr. 17, 1928 |
| 1,678,116 | Harrison | July 24, 1928 |
| 2,318,417 | Phelps | May 4, 1943 |
| 2,342,813 | Mason | Feb. 29, 1944 |

FOREIGN PATENTS

| Number | Country | Date |
|---|---|---|
| 839,805 | France | Jan. 7, 1939 |